United States Patent
Zwartenkot et al.

(10) Patent No.: US 6,493,471 B1
(45) Date of Patent: Dec. 10, 2002

(54) LINEAR HORIZONTAL AND VERTICAL ZOOM FOR COMPRESSING AN IMAGE TO A SMALLER AREA IN DISPLAY

(75) Inventors: Hendrik T. J. Zwartenkot, Nijmegen (NL); Jacob J. Veerhoek, Los Gatos, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/368,851

(22) Filed: Aug. 5, 1999

(30) Foreign Application Priority Data

Aug. 7, 1998 (EP) .............................. 98202668

(51) Int. Cl.$^7$ ................................. G06K 9/32
(52) U.S. Cl. ....................... 382/298; 348/565
(58) Field of Search ................... 382/232, 298–300; 348/565, 571, 581, 596, 628–629

(56) References Cited

U.S. PATENT DOCUMENTS

| | | | |
|---|---|---|---|
| 4,218,700 A | * | 8/1980 | Kashigi ...................... 348/665 |
| 4,656,515 A | | 4/1987 | Christopher ................. 358/183 |
| 4,717,951 A | | 1/1988 | Fling ........................... 358/22 |
| 4,730,215 A | * | 3/1988 | Jose et al. ................... 348/581 |
| 4,764,975 A | * | 8/1988 | Inoue .......................... 382/299 |
| 5,452,013 A | | 9/1995 | Ohmori ....................... 348/568 |
| 6,226,421 B1 | * | 5/2001 | Monji .......................... 382/300 |

FOREIGN PATENT DOCUMENTS

| | | | |
|---|---|---|---|
| EP | 0200330 A1 | 12/1986 | ............ H04N/5/44 |
| EP | 854438 | 7/1998 | ............ G06T/3/40 |
| GB | 2182522 A | 5/1987 | ............ H04N/5/21 |
| WO | WO9733430 | 9/1997 | ............ H04N/5/45 |

* cited by examiner

Primary Examiner—Timothy M. Johnson
(74) Attorney, Agent, or Firm—Edward W. Goodman

(57) ABSTRACT

In a video signal compression method, compression ratio control signals (K) and a previous sum (Csum) are added (AD1) to generate a new sum, compression control signals (DC, en) are logically generated (CP, CNT) in dependence upon the previous sum (Csum) and the compression ratio control signals (K), and video signals are compressed (D) in dependence upon the compression control signals (DC, en) to generate compressed video signals.

5 Claims, 1 Drawing Sheet

LINEAR HORIZONTAL AND VERTICAL ZOOM FOR COMPRESSING AN IMAGE TO A SMALLER AREA IN DISPLAY

BACKGROUND OF THE INVENTION

The invention relates to adaptive compression of video signals for, e.g., PIP or double window display.

Field of the Invention

Description of the Related Art

UK Patent Application GB-A-2,182,522, corresponding to U.S. Pat. No. 4,717,951, discloses an adaptive filtering system. A picture-in-picture television receiver, for which the viewer may change the size of the inset image, includes an adaptive anti-aliasing filter. The filter includes a variable delay element and an adder. Signals are applied to one input port of the adder and to the delay element. The signals provided by the delay element are applied to a second input port of the adder. The delay element provides time delays which may be expressed by the equation $T=K_1\tau+PK_2\tau$, where $\tau$ is a fixed amount of time, $K_1$ and $K_2$ are constants, and P is a variable. The frequency response characteristic of the filter is changed by a selection signal that changes the value of P.

SUMMARY OF THE INVENTION

It is, inter alia, an object of the invention to provide an adaptive filter having a simple control. To this end, a first aspect of the invention provides a method and device for video signal compression. A second aspect of the invention provides a display apparatus including such a video signal compression device.

In a video signal compression method in accordance with a primary aspect of this invention, compression ratio control signals and a previous sum are added to generate a new sum, compression control signals are logically generated in dependence upon the previous sum and the compression ratio control signals, and video signals are compressed in dependence upon the compression control signals to generate compressed video signals.

These and other aspects of the invention will be apparent from and elucidated with reference to the embodiments described hereinafter.

DESCRIPTION OF THE PREFERRED EMBODIMENTS

For a PIP (picture-in-picture) mode called linear zoom a digital filter is needed that compresses a video picture to a smaller size. The compression must be done in horizontal as well as in the vertical direction. The main issue of linear zoom is that the reduction, factor can be different for each new picture. For this problem a solution was found which can be applied to the horizontal and vertical compression filters. The basic scheme is shown in FIG. 1.

Figure 1:
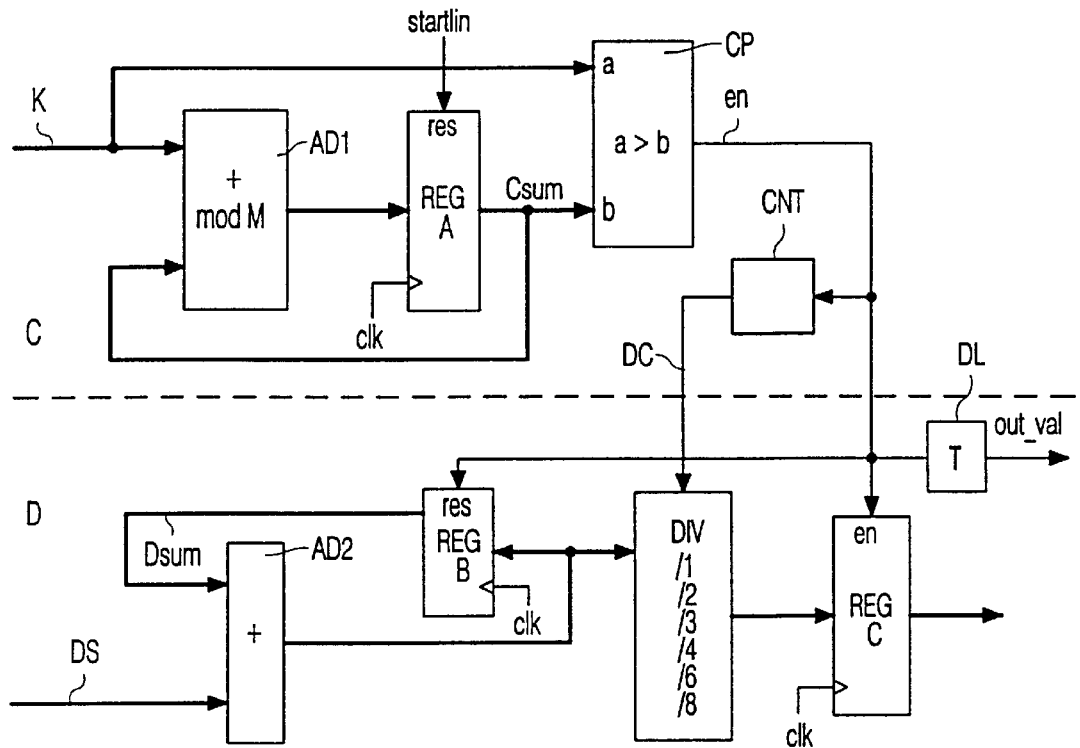
FIG. 1 shows a compression circuit in accordance with the invention.

FIG. 1, K is a number between 0 and M, where M is the number of possible reduction factors. If it is desired to zoom from 1 to 100% in 100 steps, M should be 100. The reduction factor is K/M. In the linear zoom application, K changes each field, or each two or more fields. In PIP applications, the very common reduction factors ½, ¼, ⅓ and ⅛ can be implemented using this circuit by choosing M=96 and K=48, 24, 32 and 12, respectively.

Suppose the circuit shown in FIG. 1 is used for a horizontal reduction. In the control path C, at the start of a line (indicated by the signal startlin), register REG A is reset to zero. For K>0, the enable signal en at the output of the comparator CP will then be 1 as K exceeds the output signal Csum of the register REG A. At each following clock cycle, K is added to Csum by a modulo M adder AD1, and the modulo M value is stored in register REG A. If Csum is smaller than K, the enable signal en becomes 1, and otherwise it becomes 0. The result is a regular sequence of 1's and 0's at the enable output en. This is illustrated in the following tables.

Compression ratio is ¼, so that K/M=24/96
As a result of the enable signal en having a 1 following three 0's, each time, four input pixels are combined into one output pixel, so as to provide the compression ratio of ¼.
Compression ratio is ⅔, so that K/M=64/96
As a result, alternatingly, two input pixels are combined into one output pixel (enable signal en having a 1 following one 0) and an input pixel is just passed (enable signal en having a 1 following no 0's), so as to provide the compression ratio of ⅔.

A counter CNT counts the number of zero's, and applies the result increased by one (hence, 4 in the first example and alternatingly 2 and 1 in the second example) as a division control signal DC to a controllable divider DIV in the data path D of the circuit.

In the data path D of the circuit, data samples DS, representing pixels of a line, arrive at the data input each clock cycle. The enable signal en is used to reset register REG B at zero, to enable register REG C, and to indicate a valid sample at the output (signal out-val at the output of the delay DL). Each clock cycle, if the enable signal en is 0, the adder AD2 adds the value of the new input data sample DS data to the output signal Dsum of the register REG B, and the sum is stored in the register REG B. If enable is 1, the sum is divided by the controllable divider DIV and stored into the register REG C.

The circuit can be used for vertical reduction as well. Then, the register REG B is a line memory, and the register REG A is enabled once per line.

Figure 2:
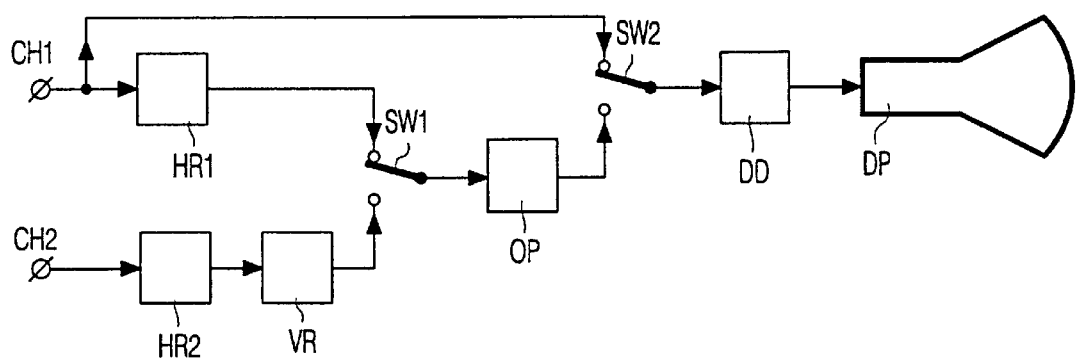
FIG. 2 shows a display apparatus comprising such a compression circuit.

The display apparatus of FIG. 2 has a first or main channel input CH1 and a second on PIP channel input CH2. The first channel input CH1 is coupled to an input of a first horizontal reduction circuit HR1 of the type shown in FIG. 1. The second channel input CH2 is coupled to an input of a second horizontal reduction circuit HR2 which is also of the type shown in FIG. 1. An output of the second horizontal reduction circuit HR2 is coupled to an input of a vertical reduction circuit VR which is of the type shown in FIG. 1 with the above-mentioned modifications. In a double window display mode, a switch SW1 alternatingly couples an input of an output processor OP to an output of the first horizontal reduction circuit HR1 or an output of the vertical reduction circuit VR. In a PIP mode, the switch SW1 couples the input of an output processor OP to the output of the vertical reduction circuit VR. A switch SW2 couples an input of a display driver DD to the first or main channel input CH1 or an output of the output processor OP. In a single display mode, the switch SW2 couples the input of the display driver DD to the first or main channel input CH1. In a PIP mode, the switch SW2 alternates between its two positions. In a double window mode, the switch SW2 couples the input of the display driver DD to the output of the output processor OP. An output of the display driver DD is coupled to a display DP.

It should be noted that the above-mentioned embodiments illustrate rather than limit the invention, and that those skilled in the art will be able to design many alternative embodiments without departing from the scope of the appended claims. The word "comprising" does not exclude the presence of other elements or steps than those listed in a claim. The invention can be implemented by means of hardware comprising several distinct elements, and by means of a suitably programmed computer. In device claims enumerating several means, several of these means can be embodied by one and the same item of hardware.

What is claimed is:

1. A video signal compression method comprising:

adding a compression ratio control signal and a previous sum to generate a new sum;

logically generating a compression control signal in dependence upon a comparison of said previous sum and said compression ratio control signal; and compressing video signals in dependence upon said compression control signal to generate compressed video signals.

2. A video signal compression device comprising:

adding means for receiving a compression ratio control signal and a previous sum, said adding means generating a new sum;

logic means for comparing said previous sum and said compression ratio control signal, said logic means generating a compression control signal; and means for compressing video signals in dependence upon said compression control signal to generate compressed video signals.

3. A device as claimed in claim 2, wherein said logic means comprises:

comparing means for determining whether said compression ratio control signal exceed said previous sum; and means for counting a number of consecutive times that said compression ratio control signal exceeds said previous sum to provide a division control signal in dependence upon said number.

4. A device as claimed in claim 2, wherein said compression means comprises:

means for accumulating input data samples, representing said video signals, in dependence upon said compression control signal to form an accumulated signal; and controllable divider means for dividing said accumulated signals in dependence upon said compression control signal.

5. A display apparatus, comprising:

at least one video signal compression device for generating compressed video signals, said video signal compression device comprising:

adding means for receiving a compression ratio control signal and a previous sum, said adding means generating a new sum;

logic means for comparing said previous sum and said compression ratio control signal, said logic means generating a compression control signal; and means for compressing video signals in dependence upon said compression control signal to generate compressed video signals; and a display device for displaying said compressed video signals.

* * * * *